US010338808B2

(12) United States Patent
Urakawa

(10) Patent No.: US 10,338,808 B2
(45) Date of Patent: Jul. 2, 2019

(54) INFORMATION PROCESSING APPARATUS AND STORAGE MEDIUM

(71) Applicant: BROTHER KOGYO KABUSHIKI KAISHA, Nagoya-shi, Aichi-ken (JP)

(72) Inventor: Yutaka Urakawa, Nagoya (JP)

(73) Assignee: BROTHER KOGYO KABUSHIKI KAISHA, Nagoya-shi, Aichi-ken (JP)

(*) Notice: Subject to any disclaimer, the term of this patent is extended or adjusted under 35 U.S.C. 154(b) by 142 days.

(21) Appl. No.: 15/276,126

(22) Filed: Sep. 26, 2016

(65) Prior Publication Data
US 2017/0090745 A1 Mar. 30, 2017

(30) Foreign Application Priority Data

Sep. 30, 2015 (JP) ................. 2015-194689

(51) Int. Cl.
G06F 3/0488 (2013.01)
H04N 1/00 (2006.01)
(Continued)

(52) U.S. Cl.
CPC ........ *G06F 3/04883* (2013.01); *G06F 3/0416* (2013.01); *G06F 3/0482* (2013.01);
(Continued)

(58) Field of Classification Search
CPC ....... G06F 3/0488; G06F 3/041; G06F 3/0484
See application file for complete search history.

(56) References Cited

U.S. PATENT DOCUMENTS 8,411,060 B1 * 4/2013 Scholler .............. G06F 3/04883
345/173
9,423,950 B2 * 8/2016 Naka ..................... G06F 3/0488
(Continued)

FOREIGN PATENT DOCUMENTS

JP 2011003970 A 1/2011
JP 2011-39709 A 2/2011
(Continued)

OTHER PUBLICATIONS

Japanese Notification of Reasons for Refusal dated May 7, 2019 received in Japanese Patent Application No. 2015-194689, together with a partial English-language translation.

Primary Examiner — David E Choi
(74) Attorney, Agent, or Firm — Scully, Scott, Murphy & Presser, P.C.

(57) ABSTRACT

An information processing apparatus including a display, a touch panel having a detection surface, and a controller configured to execute: detection processing of detecting, each time a first predetermined period has elapsed, an operation position of an operation element touched on or adjacent to the detection surface, calculation processing of calculating a moving speed of the operation element, and decision processing of deciding, in a case where the operation position becomes not detected, that an operation by the operation element is a swipe operation if a first speed is smaller than a second speed, the first speed being a moving speed calculated in the calculation processing based on a latest operation position detected in the detection processing and at least one operation position detected before the latest operation position is detected, and the second speed being a moving speed calculated before the first speed is calculated.

16 Claims, 10 Drawing Sheets

(51) Int. Cl.
*G06F 3/041* (2006.01)
*G06F 3/0485* (2013.01)
*G06F 3/0484* (2013.01)
*G06F 3/0482* (2013.01)

(52) U.S. Cl.
CPC ........ *G06F 3/0485* (2013.01); *G06F 3/04845* (2013.01); *H04N 1/00411* (2013.01); *H04N 1/00424* (2013.01); *H04N 1/00474* (2013.01); *H04N 2201/0094* (2013.01)

(56) References Cited

U.S. PATENT DOCUMENTS

| | | | |
|---|---|---|---|
| 9,734,133 B2* | 8/2017 | Tzvi | G06F 17/2247 |
| 9,875,017 B2* | 1/2018 | Nomachi | G06F 3/0488 |
| 2009/0070710 A1* | 3/2009 | Kagaya | G06F 17/30038 |
| | | | 715/810 |
| 2009/0150784 A1* | 6/2009 | Denney | G06F 17/3084 |
| | | | 715/722 |
| 2010/0317358 A1 | 12/2010 | Sawamoto | |
| 2011/0032201 A1 | 2/2011 | Naka | |
| 2011/0307815 A1* | 12/2011 | Lampinen | G06F 3/04817 |
| | | | 715/765 |
| 2012/0062604 A1 | 3/2012 | Lobo et al. | |
| 2012/0131517 A1 | 5/2012 | Yamamoto | |
| 2012/0311465 A1* | 12/2012 | Nealer | H04L 29/06 |
| | | | 715/760 |
| 2013/0169424 A1* | 7/2013 | Kujawski | G06F 3/03543 |
| | | | 340/407.2 |
| 2013/0219433 A1 | 8/2013 | Arai et al. | |
| 2013/0339908 A1* | 12/2013 | Bailey | G06F 3/017 |
| | | | 715/863 |
| 2014/0053066 A1 | 2/2014 | Imamura | |
| 2014/0126750 A1* | 5/2014 | Kitayama | H04H 60/04 |
| | | | 381/119 |
| 2014/0233059 A1* | 8/2014 | Itoh | H04N 1/00411 |
| | | | 358/1.15 |
| 2014/0347322 A1* | 11/2014 | Kamata | G06F 3/041 |
| | | | 345/174 |
| 2014/0351698 A1* | 11/2014 | Nakagawa | G06F 3/0485 |
| | | | 715/702 |
| 2015/0002424 A1* | 1/2015 | Yamamoto | G06F 3/04883 |
| | | | 345/173 |
| 2015/0054766 A1* | 2/2015 | Ishida | G06F 3/0416 |
| | | | 345/173 |
| 2015/0116371 A1* | 4/2015 | Jun | G09G 5/34 |
| | | | 345/684 |
| 2015/0199125 A1* | 7/2015 | Tsukamoto | G06F 3/04883 |
| | | | 715/765 |
| 2016/0011766 A1* | 1/2016 | Kosaka | G06F 3/04855 |
| | | | 715/787 |
| 2016/0026641 A1* | 1/2016 | Young | G06F 17/3053 |
| | | | 707/734 |
| 2016/0077702 A1* | 3/2016 | Nomachi | G06F 3/0488 |
| | | | 345/173 |
| 2017/0090745 A1* | 3/2017 | Urakawa | G06F 3/04883 |
| 2017/0090852 A1* | 3/2017 | Harada | G06F 3/0482 |

FOREIGN PATENT DOCUMENTS

| | | |
|---|---|---|
| JP | 2012128830 A | 7/2012 |
| JP | 2012208866 A | 10/2012 |
| JP | 2012230570 A1 | 11/2012 |
| JP | 2015-38666 A | 2/2015 |
| JP | 2015-43165 A | 3/2015 |

* cited by examiner

INFORMATION PROCESSING APPARATUS AND STORAGE MEDIUM

CROSS-REFERENCE TO RELATED APPLICATIONS

This application claims priority from Japanese Patent Application No. 2015-194689 filed on Sep. 30, 2015, the entire contents of which are incorporated herein by reference.

TECHNICAL FIELD

The disclosure relates to an information processing apparatus having a touch panel and a storage medium storing a control program that can be read by a computer of the information processing apparatus.

BACKGROUND

As an operation on a touch panel mounted to an information processing apparatus, a variety of operations such as a flick operation, a swipe operation, a touch operation and the like have been known. The flick operation is an operation for scrolling a display image displayed on the touch panel in accordance with movement of an operation element such as a finger and scrolling the display image by a predetermined amount even after the operation element is separated from the touch panel. The swipe operation is an operation for scrolling a display image displayed on the touch panel in accordance with movement of the operation element such as a finger and stopping the scroll at timing at which the operation element is separated from the touch panel. That is, the display image displayed on the touch panel is scrolled in a similar manner in the flick operation and the swipe operation until the operation element is separated from the touch panel. However, after the operation element is separated from the touch panel, the display image is displayed in a different manner in the flick operation and the swipe operation in accordance with an operation of the operation element at the time of the separation. For this reason, in order to detect whether an operation on the touch panel is the flick operation or the swipe operation, a variety of algorithms have been suggested. For example, in related art, when an operating speed immediately before the operation element is separated from the touch panel is equal to or smaller than a set speed, it is determined that the operation on the touch panel is the swipe operation.

According to the technology disclosed in related art, it is possible to determine the swipe operation to some extent. However, even when a user intends the swipe operation, there are cases where the operating speed is faster than the set speed immediately before the operation element is separated from the touch panel. In this case, even though the user intends to perform the swipe operation, it is determined that the operation on the touch panel is the flick operation, so that an operation coinciding with the user's intention cannot be performed.

SUMMARY

The disclosure has been made in view of the above situation, and an object of the disclosure is to lower false recognition between a flick operation and a swipe operation.

According to an aspect of the disclosure, there is provided an information processing apparatus including: a display; a touch panel having a detection surface arranged on a display surface of the display; and a controller configured to execute: detection processing of detecting, each time a first predetermined period has elapsed, an operation position of an operation element which is touched on or adjacent to the detection surface, calculation processing of calculating, each time the operation position has been detected in the detection processing, a moving speed of the operation element based on the detected operation position and at least one operation position detected before the detected operation position is detected, and decision processing of deciding, in a case where the operation position becomes not detected in the detection processing, that an operation by the operation element is a swipe operation if a first speed is smaller than a second speed, the first speed being a moving speed calculated in the calculation processing based on a latest operation position detected in the detection processing and at least one operation position detected in the detection processing before the latest operation position is detected, and the second speed being a moving speed calculated in the calculation processing before the first speed is calculated in the calculation processing.

According to another aspect of the disclosure, there is provided an information processing apparatus including: a display; a touch panel having a detection surface arranged on a display surface of the display, and a controller configured to execute: detection processing of detecting, each time a predetermined period has elapsed, an operation position of an operation element which is touched on or adjacent to the detection surface, calculation processing of calculating, each time the operation position has been detected in the detection processing, a moving speed of the operation element based on the detected operation position and at least one operation position detected before the detected operation position is detected, and display control processing of displaying an image on the display surface of the display, wherein, in the display control processing, while the operation position is continuously detected after the controller has started to detect the operation position of the operation element in the detection processing, the controller displays the image so that at least a part of the image follows movement of the detection position detected in the detection processing, in a case where the operation position becomes not detected in the detection processing, if a first speed, which is a moving speed calculated in the calculation processing based on a latest operation position detected in the detection processing and at least one operation position detected in the detection processing before the latest operation position is detected, is smaller than a second speed, which is a moving speed calculated in the calculation processing before the first speed is calculated in the calculation processing, the controller displays the image so that at least a part of the image is moved in a direction of the first speed even after the operation position becomes not detected in the detection processing, and in a case where the operation position becomes not detected in the detection processing, if the first speed is smaller than the second speed, the controller displays the image so that at least a part of the image is stopped at a timing at which the operation position becomes not detected in the detection processing.

According to another aspect of the disclosure, there is provided a non-transitory computer-readable storage medium storing computer-readable instructions, the instructions, when executed by a computer of an information processing apparatus including a display and a touch panel having a detection surface arranged on a display surface of the display, causing the computer to execute: detection processing of detecting, each time a first predetermined period has elapsed, an operation position of an operation element which is touched on or adjacent to the detection surface, calculation processing of calculating, each time the operation position has been detected in the detection processing, a moving speed of the operation element based on the detected operation position and at least one operation position detected before the detected operation position is detected, and decision processing of deciding, in a case where the operation position becomes not detected in the detection processing, that an operation by the operation element is a swipe operation if a first speed is smaller than a second speed, the first speed being a moving speed calculated in the calculation processing based on a latest operation position detected in the detection processing and at least one operation position detected in the detection processing before the latest operation position is detected, and the second speed being a moving speed calculated in the calculation processing before the first speed is calculated in the calculation processing.

When the operation element is separated from the touch panel at a state where the user reduces the moving speed of the operation element, it is considered that the user intends the swipe operation. Therefore, in the information processing apparatus and the like of the disclosure, when the operating speed of the operation element immediately before the operation element is separated from the touch panel is smaller than an operating speed calculated earlier than the corresponding operating speed, it is determined that the operation by the operation element is the swipe operation. Thereby, it is possible to determine that the operation of the operation element is the swipe operation, with the user's intention being appropriately reflected, and to lower the false recognition between the flick operation and the swipe operation.

DETAILED DESCRIPTION

<Configuration of MFP>

Figure 1:
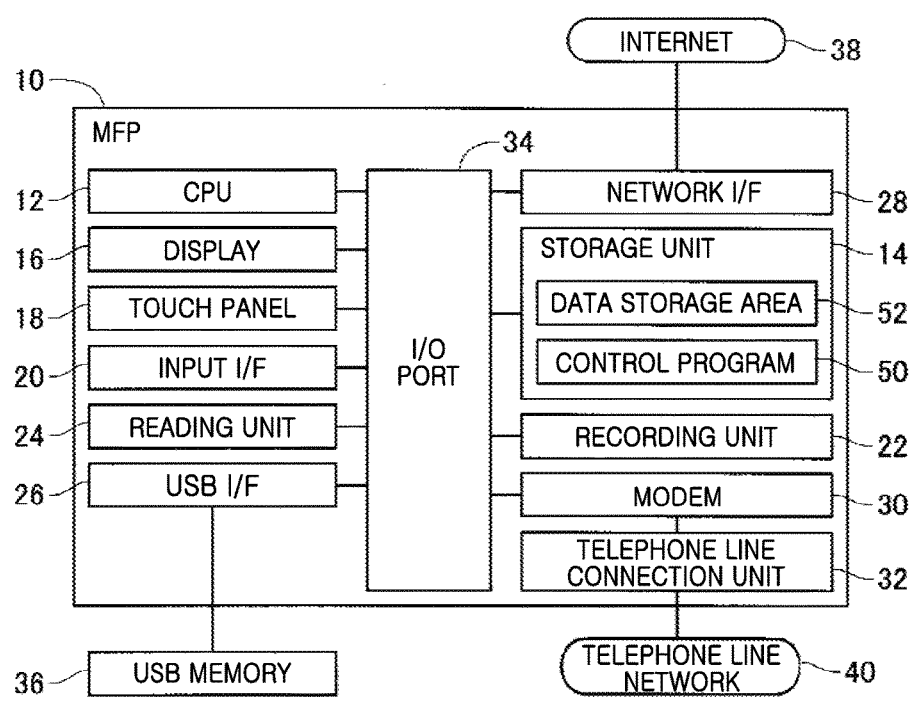
FIG. 1 is a block diagram of an MFP 10.

FIG. 1 is a block diagram of an MFP (abbreviation of Multifunction Peripheral) (which is an example of the information processing apparatus of the disclosure) 10 exemplified as an illustrative embodiment of the disclosure.

The MFP 10 mainly has a CPU (which is an example of the controller and the computer of the disclosure) 12, a storage unit 14, a display 16, a touch panel (which is an example of the touch panel of the disclosure) 18, an input I/F 20, a recording unit 22, a reading unit 24, an USB I/F 26, a network I/F 28, a modem 30, and a telephone line connection unit 32. The constitutional elements are configured to perform communication with each other via an input/output (I/O) port 34.

The display 16 has a display surface on which a variety of functions of the MFP 10 are to be displayed. As an example of the display, an LCD, an organic EL, a plasma display and the like may be enumerated. The touch panel 18 has a detection surface (which is an example of the detection surface of the disclosure) configured to cover the display surface of the display 16. The touch panel 18 is configured to detect approach/touch of an electrode of an operation element such as a touch pen and a user's finger with respect to the detection surface, and to output an electric signal which specifies coordinates on the detection surface in accordance with the detection. In the meantime, the touch panel 18 may be a matrix switch type, a resistance film type, an infrared type, an electromagnetic induction type, an electrostatic capacitance type or the like. The input I/F 20 is a hard key and the like.

The recording unit 22 is a printing mechanism and may be an inkjet head, for example. The CPU 12 is configured to input a driving signal to the recording unit 22. When the recording unit 22 is an inkjet head, it ejects ink from nozzles in accordance with the input driving signal. The reading unit 24 is a unit configured to read an image and to execute a scan operation, and may be a CCD image sensor, a contact image sensor or the like, for example.

The USB I/F 26 is configured so that a USB memory 36 can be connected thereto. Thereby, the MFP 10 can store data in the USB memory 36 or output the data stored in the USB memory 36. Also, the network I/F 28 is connected to the Internet 38. Thereby, the MFP 10 can perform data communication with an external apparatus via the network I/F 28.

The modem 30 is configured to modulate document data, which is to be transmitted by a facsimile function, into a signal that can be transmitted to a telephone line network 40 and to transmit the signal through the telephone line connection unit 32, and to receive a signal input from the telephone line network 40 through the telephone line connection unit 32 and to demodulate the document data.

The CPU 12 is configured to execute processing in accordance with a control program (which is an example of the program of the disclosure) 50 stored in the storage unit 14. The control program 50 is a program for executing a variety of functions in the MFP 10. In the meantime, the storage unit 14 is configured by a combination of a RAM (abbreviation of Random Access Memory), a ROM (abbreviation of Read Only Memory), a flash memory, an HDD (abbreviation of Hard Disk), a buffer of the CPU 12, and the like. Also, the storage unit 14 has a data storage area 52. The data storage area 52 is an area in which data required to execute the control program 50 and the like are stored.

<Execution of Various Processing by MFP 10>

Figure 2:
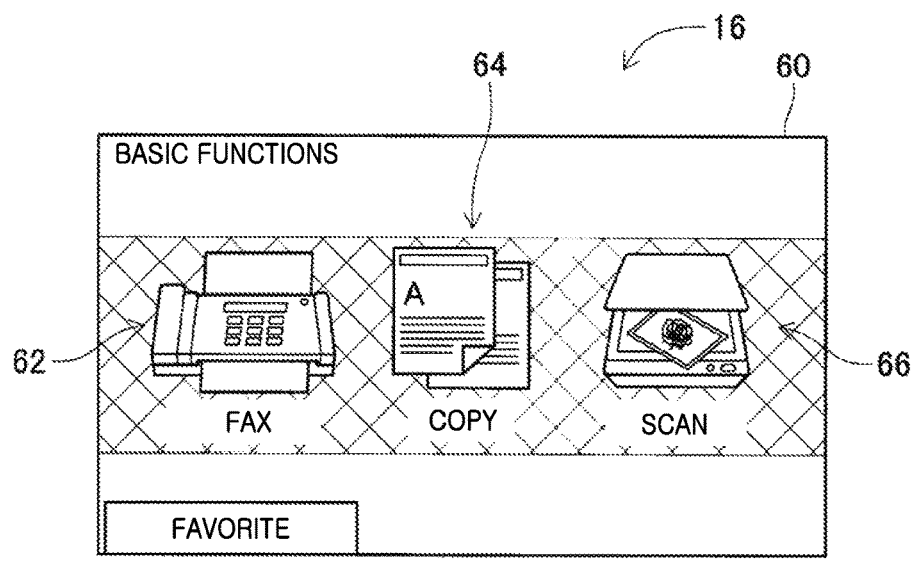
FIG. 2 depicts a menu screen 60.

The MFP 10 can execute a variety of processing such as copy processing, scan processing and the like by the above-described configuration. Specifically, a menu screen 60 shown in FIG. 2 is usually displayed on the display 16 of the MFP 10. In the menu screen 60, a plurality of icons such as a FAX icon 62, a copy icon 64, a scan icon 66 and the like are displayed. The FAX icon 62 is an icon for selecting FAX processing. The copy icon 64 is an icon for selecting copy processing. The scan icon 66 is an icon for selecting scan processing. Also, in the menu screen 60, the plurality of icons such as the FAX icon 62 can be scrolled in a left-right direction by an operation in the left-right direction of the operation element such as a finger on the display 16.

Specifically, for example, when a user brings the operation element into contact with or adjacent to the display 16, an operation position of the operation element is detected by the touch panel 18. Also, for example, when the user moves leftward the operation element, leftward movement of the operation position is detected in the MFP 10, and the plurality of icons is moved leftward in accordance with the detection. That is, the MFP 10 scrolls leftward a display image of the menu screen 60. At this time, a new icon such as a setting icon is moved leftward from a right side of the menu screen 60 and is displayed on the display 16. When the operation element is separated from the display 16, the scrolling of the display image stops. In the meantime, the operation for scrolling the display image includes a flick operation and a swipe operation. The method of stopping the scrolling of the display image is different between the respective operations.

Specifically, for example, when a leftward flick operation is performed, the MFP 10 scrolls leftward the display image, and continues to scroll the display image even after the operation element has separated from the display 16. In the meantime, when a leftward swipe operation is performed, the MFP 10 scrolls leftward the display image, and stops the scrolling of the display image at timing at which the operation element has separated from the display 16. That is, the flick operation is an operation that is intended to continue the scrolling towards a moving direction of the operation element during predetermined time after the operation element is moved with being touched or approached to the display 16. Also, the swipe operation is an operation that is intended to stop the scrolling at timing at which the operation element is separated from the display 16 after the operation element is moved with being touched or approached to the display 16. In the meantime, an area (referred to as 'scroll area') of the menu screen 60, in which the display image can be scrolled when the flick operation or the swipe operation is received, is a hatched area in FIG. 2. That is, the scroll area includes an area in which the plurality of icons such as the FAX icon 62 is displayed, an area between the plurality of icons and a predetermined area above and below the plurality of icons.

In this way, the display image is scrolled in the left-right direction on the menu screen 60, so that the three icons of the plurality of icons are displayed on the display 16. When a state where the operation element is touched or approached to any icon of the three icons displayed on the display 16 without being moved in the left-right direction continues during a predetermined time, even if it is very short, it is determined that the corresponding icon is operated. Thereby, a screen corresponding to the icon is displayed on the display 16, instead of the menu screen 60. In the meantime, such operation on the icon may also be referred to as a touch operation.

Figure 3:
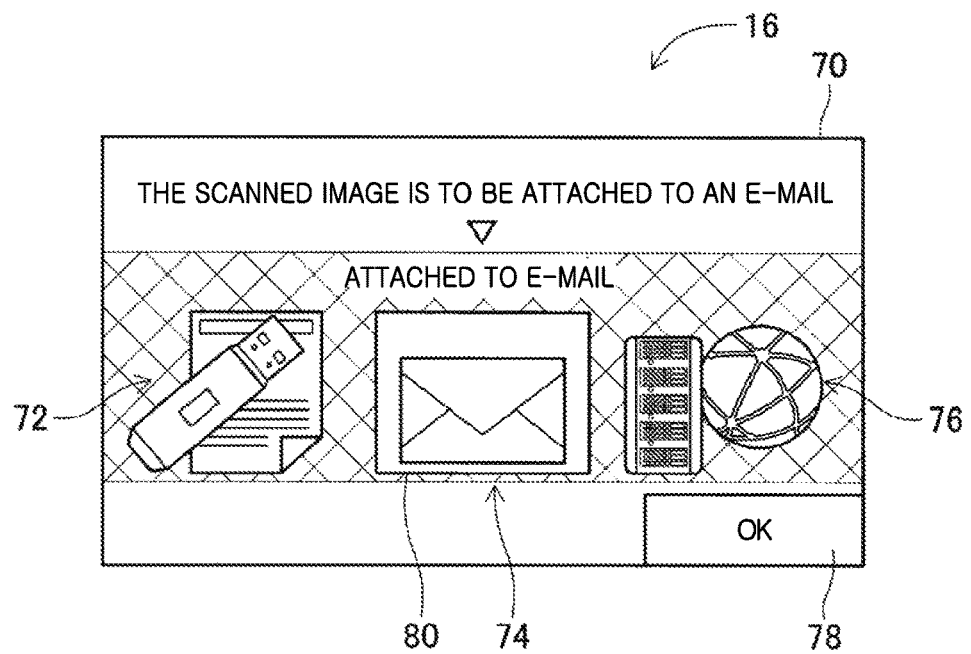
FIG. 3 depicts a scan screen 70.

Specifically, for example, at a state where a scan icon 66 is displayed on the menu screen 60, when a touch operation on the scan icon 66 is performed, a scan screen 70 shown in FIG. 3 is displayed on the display 16. In the scan screen 70, a plurality of icons such as a scan to USB icon 72, a scan to Email icon 74 and a scan to FTP icon 76, and an OK icon 78 are displayed. The scan to USB icon 72 is an icon for selecting scan to USB processing of storing image data read by the reading unit 24 into the USB memory 36. The scan to Email icon 74 is an icon for selecting scan to Email processing of transmitting image data read by the reading unit 24 through an Email. The scan to FTP icon 76 is an icon for selecting scan to FTP processing of transmitting image data read by the reading unit 24 to an FTP server.

Also in the scan screen 70, the plurality of icons such as the scan to USB icon 72 can be scrolled in the left-right direction by the flick operation or the swipe operation, like the menu screen 60. Meanwhile, also in the scan screen 70, an area where the display image can be scrolled by the flick operation or the swipe operation, i.e., an scroll area includes an area in which the plurality of icons such as the scan to USB icon 72 is displayed, an area between the plurality of icons and a predetermined area above and below the plurality of icons. As the scan screen 70 is scrolled in the left-right direction by the flick operation or the swipe operation, a new icon for selecting scan processing different from the scan to USB processing and the like is moved from one end in the left-right direction of the scan screen 70 towards the other end, and is displayed on the display 16. In the scan screen 70, when any icon of the plurality of icons is moved to a setting area 80 displayed at a center of the scan screen 70 and the OK icon 78 is operated, scan processing corresponding to the icon is executed.

Figure 4:
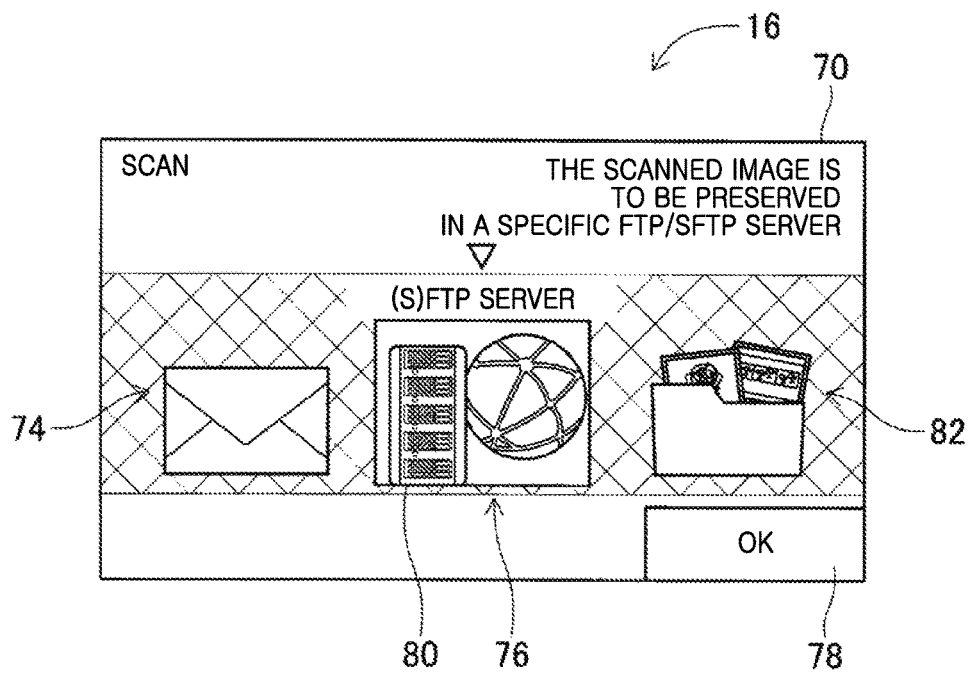
FIG. 4 depicts the scan screen 70.

Specifically, although the three icons are displayed in the scan screen 70, the setting area 80 is displayed to overlap a display position of an icon positioned at a center of the three icons. In the meantime, the setting area 80 is an area preset by coordinates on the display surface. When the user wants to execute the scan to FTP processing, for example, the user touches the scroll area of the display 16 with the operation element or moves leftward the operation element with being touched to the scroll area, in the scan screen 70 of FIG. 3. Thereby, the MFP 10 scrolls leftward the display image. At this time, the MFP 10 stops the scan to FTP icon 76 at the setting area 80. That is, the MFP 10 scrolls the display image by the swipe operation and stops the scan to FTP icon 76 at the setting area 80, as shown in FIG. 4. At a state where the scan to FTP icon 76 stops at the setting area 80, when the user touches the OK icon 78, the scan to FTP processing is executed. In the meantime, as the icon such as the scan to FTP icon 76 is scrolled, a new icon (a scan to file icon 82) is moved leftward from a right end of the scan screen 70 and is thus displayed on the display 16.

In this way, in the scan screen 70, it is necessary to stop an icon of scan processing, which the user wants to execute, at the setting area 80 by performing the swipe operation. Meanwhile, in the menu screen 60, in order to display an icon of the plurality of icons, which corresponds to processing to be executed, on the display 16, the flick operation is mainly performed. In the meantime, as the basic swipe operation, the user brings the operation element adjacent to the display 16 or moves the operation element with being touched to the display 16, and then stops and separates the operation element from the display 16. Also, as the basic flick operation, the user brings the operation element adjacent to the display 16 or moves the operation element with being touched to the display 16, and separates the operation element from the display 16 while continuing to move the operation element.

Figure 5:
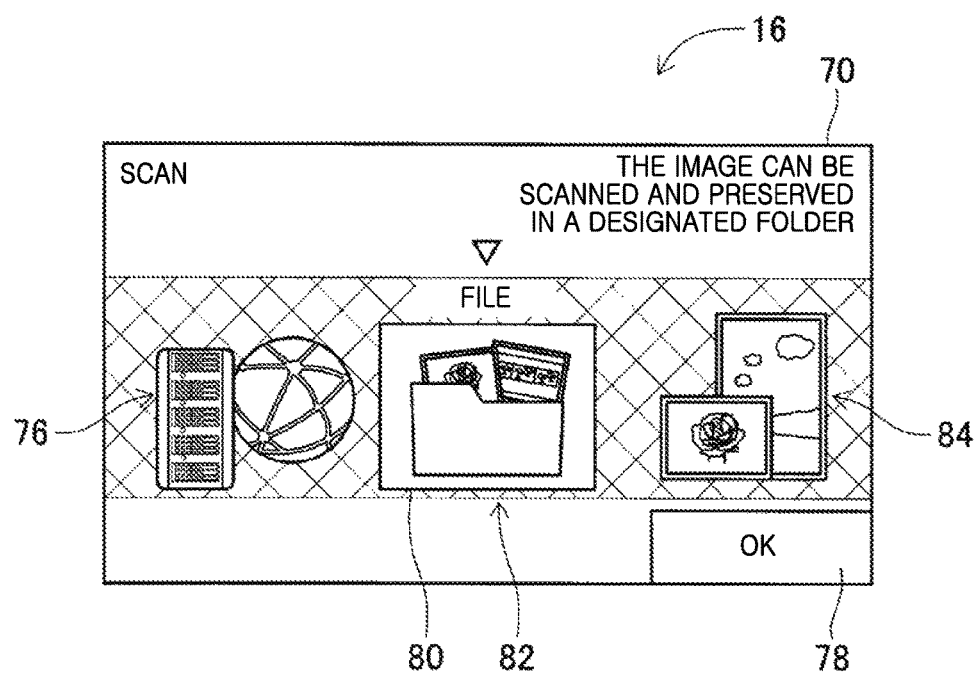
FIG. 5 depicts the scan screen 70.

However, when the user intends to stop any icon at the setting area 80 in the scan screen 70 by the swipe operation, for example, there are cases where the user separates the operation element from the display 16 at a state where the operation element is not stopped. In this case, for example, in the scan screen 70 of FIG. 3, even when the user touches the display 16 with the operation element or moves leftward the operation element with being touched to the display 16 and separates the operation element from the display 16 with the intention of stopping the scan to FTP icon 76 at the setting area 80, the user operation may be determined as the flick operation, so that the scan to FTP icon 76 passes by the setting area 80 and the scan to file icon 82 stops at the setting area 80, as shown in FIG. 5. In the meantime, as the icon such as the scan to FTP icon 76 is scrolled, a new icon (a scan image icon 82) is moved leftward from the right end of the scan screen 70 and is thus displayed on the display 16.

Therefore, as a method for determining whether the operation on the display 16 is the flick operation or the swipe operation, an apparatus of the related art adopts a method of determining an operation on a display as the swipe operation when an operating speed of the operation element at the time that the operation element is separated from the display 16 after being moved with being approached or touched to the display 16 is equal to or smaller than a set speed A (a relatively slow speed, for example, 5 pixels/second).

However, the detection of the operation position by the touch panel 18 is performed each time a predetermined period has elapsed, and it is limited to shorten the period. Therefore, even when the speed of the operation element is equal to or smaller than the set speed A at the time that the operation element is actually separated from the display 16, the speed of the operation element which is calculated at the detection timing may be faster than the set speed A. Also, even when the user separates the operation element from the display 16 through the swipe operation, the speed of the operation element upon the separation from the display 16 may be faster than the set speed A, depending on an operation feeling of the user. In these cases, even though the user intends to perform the swipe operation, the apparatus may determine the operation on the display 16 as the flick operation and may not perform an operation conforming to the user's intention.

In view of the above situations, when the speed of the operation element upon the separation from the display 16 decelerates, the MFP 10 determines the operation on the display 16 as the swipe operation, and when the speed of the operation element upon the separation from the display 16 does not decelerate, the MFP 10 determines the operation on the display 16 as the flick operation. The reason is follows. That is, even in a case where the moving speed of the operation element is fast to some extent when the user separates the operation element from the display 16, in a case where the user separates the operation element from the display 16 while decelerating the moving speed of the operation element, it can be considered that the user operates the operation element with the intention of the swipe operation.

Specifically, the touch or approach of the operation element is detected by the touch panel 18 each time a predetermined period has elapsed. In this illustrative embodiment, the predetermined period is 50 msec. When the touch or approach of the operation element is detected by the touch panel 18, a detection position thereof is stored in the data storage area 52, as current coordinates ($X_N$, $Y_N$). Also, detection time is stored in the data storage area 52, as current time $T_N$. After the current coordinates ($X_N$, $Y_N$) are stored, when the touch or approach of the operation element is again detected by the touch panel 18, the current coordinates ($X_N$, $Y_N$) are rewritten to previous coordinates ($X_O$, $Y_O$), so that the newly detected detection position is stored as the current coordinates ($X_N$, $Y_N$). Also, the current time $T_N$ is rewritten to previous time $T_O$, so that new detection time is stored as the current time $T_N$.

Then, based on the current coordinates ($X_N$, $Y_N$), the previous coordinates ($X_O$, $Y_O$), the current time $T_N$ and the previous time $T_O$, the operating speed of the operation element is calculated. Specifically, an operating speed $V_X$ of the operation element in the left-right direction is calculated by a following equation.

$$V_X = |X_N - X_O| / (T_N - T_O)$$

Also, an operating speed $V_Y$ of the operation element in the upper-lower direction is calculated by a following equation.

$$V_Y = |Y_N - Y_O| / (T_N - T_O)$$

When the operating speeds $V_X$, $V_Y$ of the operation element are calculated, the operating speeds $V_X$, $V_Y$ are stored in the data storage area 52 as current speeds $V_{XN}$, $V_{YN}$. In the meantime, the operating speed is a scalar quantity, not a vector quantity. That is, the operating speed does not include a concept of an operating direction. For this reason, in order to specify the operating direction of the operation element, $\Delta X$ and $\Delta Y$ are also stored in the data storage area 52. Specifically, $\Delta X$ and $\Delta Y$ are calculated by following equations.

$$\Delta X = X_N - X_O$$

$$\Delta Y = Y_N - Y_O$$

The coordinates of the detection surface are defined so that when $\Delta X$ is plus, the operating direction of the operation element is specified as rightward, and when $\Delta X$ is minus, the operating direction of the operation element is specified as leftward. Likewise, the coordinates of the detection surface are defined so that when $\Delta Y$ is plus, the operating direction of the operation element is specified as upwards, and when $\Delta Y$ is minus, the operating direction of the operation element is specified as downwards.

After the current speeds $V_{XN}$, $V_{YN}$ are stored, when the touch or approach of the operation element is detected by the touch panel 18, values of previous speeds $V_{XO}$, $V_{YO}$ are rewritten with current speeds $V_{XN}$, $V_{YN}$, and the previous time $T_O$ is rewritten with the current time $T_N$. Also, based on the new detection position, operating speeds $V_X$, $V_Y$ of the operation element are calculated, and the operating speeds $V_X$, $V_Y$ are stored as the current speeds $V_{XN}$, $V_{YN}$. That is, each time the operation position of the operation element is detected by the touch panel 18, the operating speeds $V_X$, $V_Y$ of the operation element are calculated, and the calculated operating speeds $V_X$, $V_Y$ are stored as the current speeds $V_{XN}$, $V_{YN}$. Also, the operating speeds $V_X$, $V_Y$ calculated immediately before the current speeds $V_{XN}$, $V_{YN}$ are stored as the previous speeds $V_{XO}$, $V_{YO}$.

Each time the operation position of the operation element is detected by the touch panel 18, the current speeds $V_{XN}$, $V_{YN}$ and the previous speeds $V_{XO}$, $V_{YO}$ are stored. However, when the operation position of the operation element is not detected by the touch panel 18, i.e., when the operation element is separated from the display 16, it is determined whether the current speeds $V_{XN}$, $V_{YN}$ are equal to or smaller than the set speed A. In the meantime, when the operating direction of the operation element is the left-right direction, it is determined whether the current speed $V_{XN}$ is equal to or smaller than the set speed A, and when the operating direction of the operation element is the upper-lower direction, it is determined whether the current speed $V_{YN}$ is equal to or smaller than the set speed A. At this time, when the current speeds $V_{XN}$, $V_{YN}$ are equal to or smaller than the set speed A, it is determined that the operation on the display 16 is the swipe operation.

On the other hand, when the current speeds $V_{XN}$, $V_{YN}$ are not the set speed A or smaller, it is determined whether the current speeds $V_{XN}$, $V_{YN}$ are smaller than the previous speeds $V_{XO}$, $V_{YO}$, i.e., whether the speed upon the separation of the operation element from the display 16 decelerates. In the meantime, when the operating direction of the operation element is the left-right direction, i.e., when an absolute value of $\Delta X$ is greater than an absolute value of $\Delta Y$, it is determined whether the current speed $V_{XN}$ is smaller than the previous speed $V_{XO}$, and when the operating direction of the operation element is the upper-lower direction, i.e., when an absolute value of $\Delta Y$ is greater than an absolute value of $\Delta X$, it is determined whether the current speed $V_{YN}$ is smaller than the previous speed $V_{YO}$. When the current speeds $V_{XN}$, $V_{YN}$ are not smaller than the previous speeds $V_{XO}$, $V_{YO}$, i.e., when the speed upon the separation of the operation element from the display 16 accelerates or when the operation element is separated from the display 16 without a change in moving speed of the operation element, it is determined that the operation on the display 16 is the flick operation.

Figure 6:
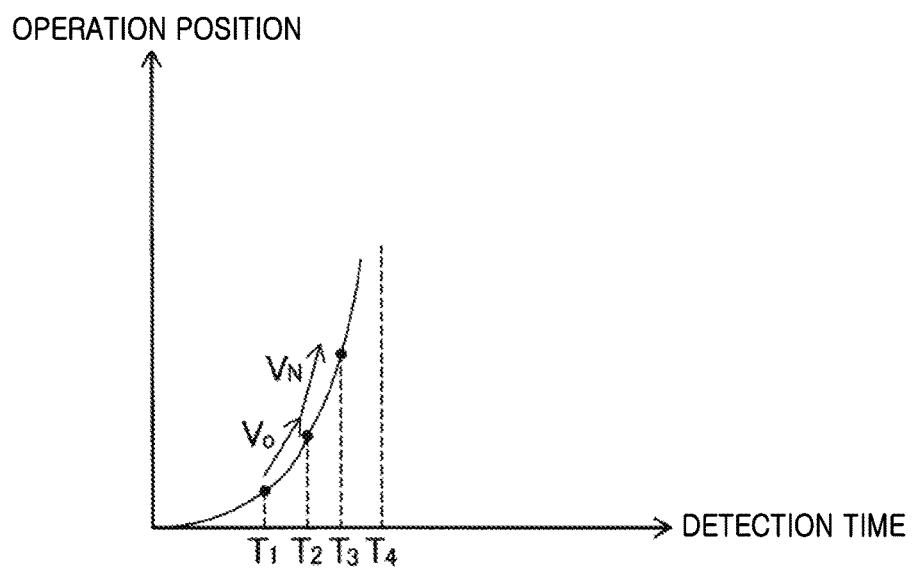
FIG. 6 depicts a relation between an operation position of an operation element and detection time upon a flick operation.

Specifically, for example, the user operation on the scan screen 70, which is shown in FIG. 3, is described. That is, an operation where the operation element is moved in the left-right direction is described. Regarding the operation on the scan screen 70, when a relation between an operation position detected by the touch panel 18 and detection time is changed as shown in FIG. 6, for example, an operation position at detection time $T_4$ is not detected by the touch panel 18. For this reason, the current speed $V_{XN}$ (denoted as $V_N$ in FIG. 6) is calculated based on an operation position at detection time $T_3$, an operation position at detection time $T_2$, the detection time $T_3$ and the detection time $T_2$, and the previous speed $V_{XO}$ (denoted as $V_O$ in FIG. 6) is calculated based on the operation position at detection time $T_2$, an operation position at detection time $T_1$, the detection time $T_2$ and the detection time $T_1$. When the current speed $V_{XN}$ is not the set speed A or smaller, it is determined whether the current speed $V_{XN}$ is smaller than the previous speed $V_{XO}$. In FIG. 6, the current speed $V_{XN}$ is equal to or greater than the previous speed $V_{XO}$. That is, the speed upon the separation of the operation element from the display 16 accelerates. For this reason, when the relation between the operation position detected by the touch panel 18 and the detection time has changed as shown in FIG. 6, it is determined that the operation on the display 16 is the flick operation.

Figure 7:
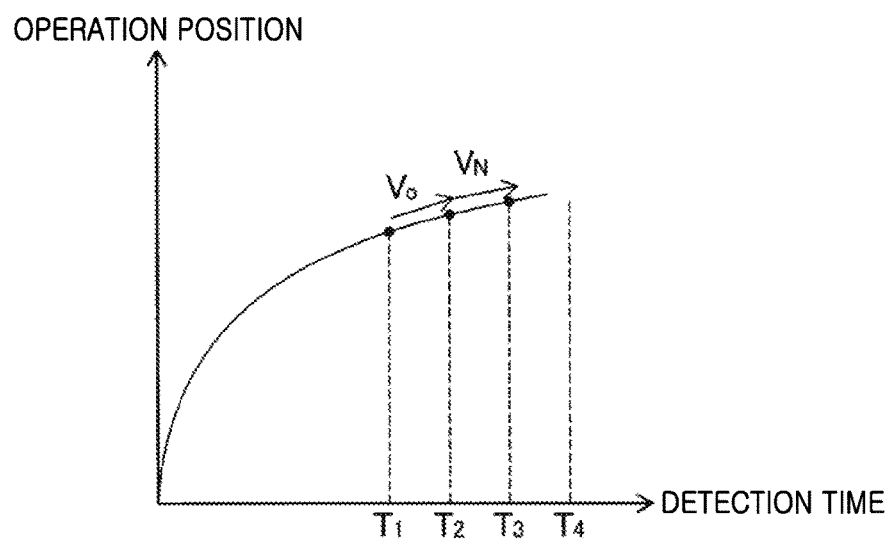
FIG. 7 depicts a relation between an operation position of the operation element and detection time upon a swipe operation.

On the other hand, when the current speed $V_{XN}$ is smaller than the previous speed $V_{XO}$, i.e., when the speed upon the separation of the operation element from the display 16 decelerates, it is determined that the operation on the display 16 is the swipe operation. Specifically, when the relation between the operation position detected by the touch panel 18 and the detection time is changed as shown in FIG. 7, for example, an operation position at detection time $T_4$ is not detected by the touch panel 18. For this reason, like the example shown in FIG. 6, the current speed $V_{XN}$ (denoted as $V_N$ in FIG. 7) is calculated based on an operation position at detection time $T_3$, an operation position at detection time $T_2$, the detection time $T_3$ and the detection time $T_2$, and the previous speed $V_{XO}$ (denoted as $V_O$ in FIG. 7) is calculated based on the operation position at detection time $T_2$, an operation position at detection time $T_1$, the detection time $T_2$ and the detection time $T_1$. When the current speed $V_{XN}$ is not the set speed A or smaller, it is determined whether the current speed $V_{XN}$ is smaller than the previous speed $V_{XO}$. In FIG. 7, the current speed $V_{XN}$ is smaller than the previous speed $V_{XO}$. That is, the speed upon the separation of the operation element from the display 16 decelerates. For this reason, when the relation between the operation position detected by the touch panel 18 and the detection time has changed as shown in FIG. 7, it is determined that the operation on the display 16 is the swipe operation.

Also, the flick operation and the swipe operation are the same until the operation element is separated from the display 16. Therefore, during the flick operation and the swipe operation, while the operation position is continuously detected, the display image is scrolled by the same method until the operation position is not detected. Specifically, after the operation position is first detected, while the operation position is detected for each detection, the display image is scrolled so that it is moved in accordance with the detected operation position. That is, during the flick operation and the swipe operation, the display image is scrolled so that it follows the movement of the operation element until it is detected that the operation element is separated from the display 16. In the meantime, "follow" is to move an image towards coordinates corresponding to a detection position at a state where coordinates on the display surface are set for all detection positions that can be detected by the touch panel 18. Specifically, the number of pixels in X and Y directions, which can be expressed on the display 16, coincides with the number of coordinates in X and Y directions on the detection surface of the touch panel 18. That is, each of the coordinates on the detection surface of the touch panel 18 has a corresponding pixel on the display 16. For this reason, a detection point of the touch panel 18 and the coordinates on the display surface of the display 16 have a one-on-one relation, so that an image is moved by a pixel corresponding to $\Delta X$ so as to follow the movement of the operation element. In the meantime, when the detection point of the touch panel 18 and the coordinates on the display surface of the display 16 do not have a one-on-one relation, $\Delta X$ is converted in accordance with a ratio of the detection point of the touch panel 18 and the coordinates on the display surface of the display 16, and an image is moved by a pixel corresponding to the converted value.

While the display image is scrolled to follow the movement of the operation element, when the operation element is separated from the display 16 and it is determined at that time that the operation is the flick operation, a scroll amount is calculated based on the current speed $V_{XN}$. That is, a calculation equation for calculating a scroll amount based on the current speed $V_{XN}$ is stored in the data storage area 52, and a scroll amount is calculated based on the calculation equation. The calculation equation is an increasing function having the current speed $V_{XN}$ as a variable. From timing at which the operation element is separated from the display 16, the display image is scrolled by a distance equivalent to the calculated scroll amount and then the scroll is stopped. Also, while the display image is scrolled to follow the movement of the operation element, when the operation element is separated from the display 16 and it is determined at that time that the operation is the swipe operation, the scroll is stopped at the determined timing. At this time, for example, any icon is displayed in the setting area 80 of the scan screen 70 upon the stop of the scroll.

However, for example, a plurality of icons may be positioned in the setting area 80 at timing at which the scroll is stopped during the swipe operation on the scan screen 70. In this case, the display image is moved so that only an icon, which has the largest occupying area in the setting area 80 of the plurality of icons positioned in the setting area 80, enters the setting area 80, and the scroll is then stopped. Thereby, only one icon is displayed in the setting area 80. Also, as a touch operation, it is determined as the touch operation when the detection speed is kept at zero (0) and the separation of the operation element from the display 16 is detected after the touch or approach of the operation element is detected by the touch panel 18.

Figure 8:
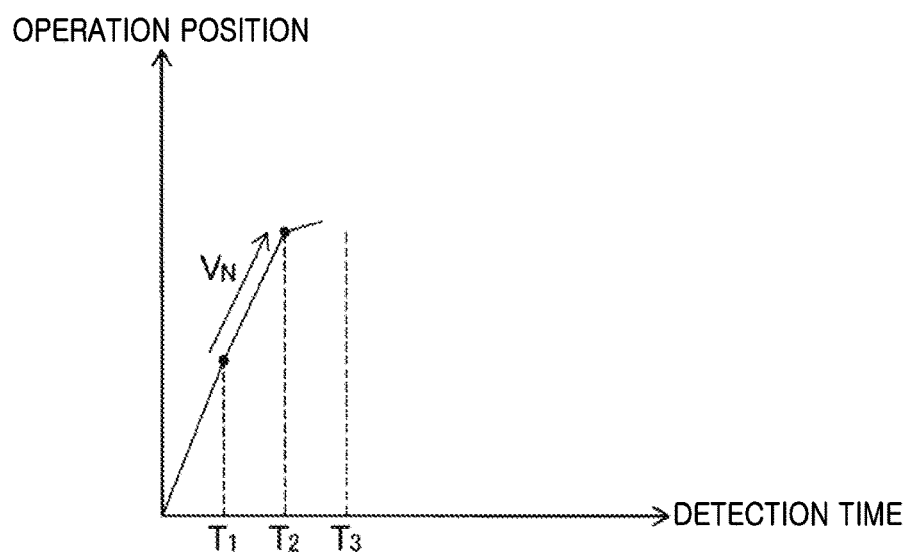
FIG. 8 depicts a relation between the operation position of the operation element and the detection time upon the swipe operation.

Like this, when the speed of the operation element upon the separation from the display 16 decelerates, i.e., when the operation element is separated from the display 16 while decelerating the moving speed of the operation element, the operation on the display 16 is determined as the swipe operation. Thereby, it is possible to appropriately determine the swipe operation in accordance with the user operation. However, when the operating speed of the operation element is fast, it may not be possible to appropriately determine the swipe operation in some cases. Specifically, when the relation between the operation position detected by the touch panel 18 and the detection time has changed as shown in FIG. 8, for example, an operation position at detection time $T_3$ is not detected by the touch panel 18. For this reason, the current speed $V_{XN}$ (denoted as $V_N$ in FIG. 8) is calculated based on an operation position at detection time $T_2$, an operation position at detection time $T_1$, the detection time $T_2$ and the detection time $T_1$. Then, it is determined whether the current speed $V_{XN}$ is smaller than the previous speed $V_{XO}$ calculated immediately before the current speed $V_{XN}$. At this time, for example, when the current speed $V_{XN}$ is equal to or greater than the previous speed $V_{XO}$, it is determined that the operation on the display 16 is the flick operation.

However, as can be seen from FIG. 8, the operating speed of the operation element decelerates immediately before the operation element is separated from the display 16. Specifically, an operation position at detection time $T_3$ is not detected by the touch panel 18. That is, the operation element is being separated from the display 16 between the detection time $T_2$ and the detection time $T_3$. An amount of change in the operation position per unit time decreases immediately before the operation element is separated from the display 16 after detection time $T_2$. For this reason, it is considered that the user operates the operation element with the intention of the swipe operation. That is, according to the above method, it may not be possible to appropriately determine the swipe operation in accordance with the user operation.

Figure 9:
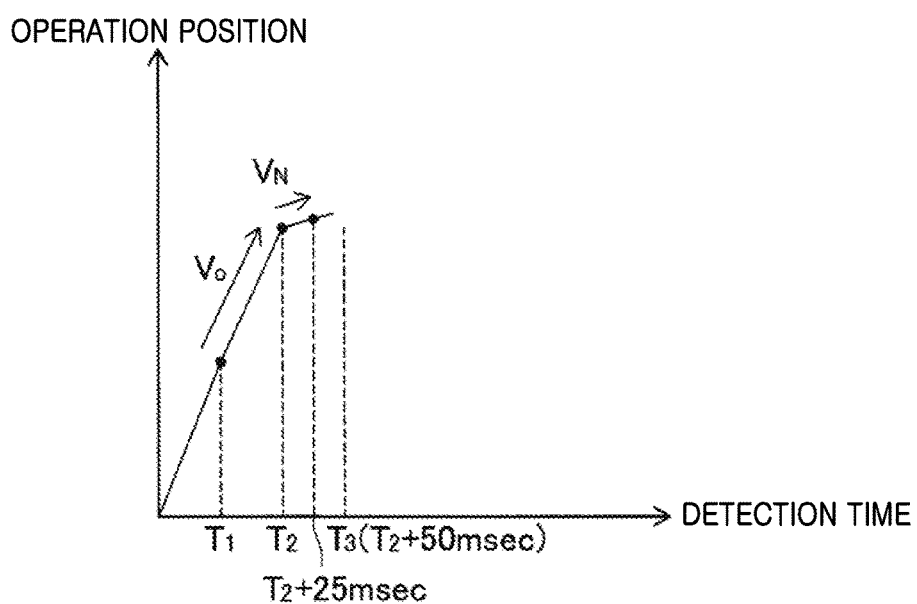
FIG. 9 depicts a relation between the operation position of the operation element and the detection time upon the swipe operation.

In view of the above situations, when the calculated operating speed of the operation element is equal to or greater than a set speed B (a relatively fast speed, for example, 30 pixels/second), the detection period of the operation position by the touch panel 18 is shortened. The reason is as follows: when the operating speed of the operation element is fast to some extent, the operating speed upon the separation of the operation element from the display 16 rapidly decelerates. Therefore, when the detection period is long, the operation position may not be detected upon the deceleration. Specifically, when the relation between the operation position detected by the touch panel 18 and the detection time has changed as shown in FIG. 9, for example, if the operation position is detected at detection time $T_2$, the operating speed $V_X$ is calculated based on an operation position at detection time $T_2$, an operation position at detection time $T_1$, the detection time $T_2$ and the detection time $T_1$. Then, it is determined whether the calculated operating speed $V_X$ is equal to or greater than the set speed B.

At this time, for example, when the operating speed $V_X$ is equal to or greater than the set speed B, the detection period of the operation position by the touch panel 18 is a half of the normal state, i.e., 25 msec. For this reason, at detection time ($T_{2+25msec}$), when the detection is made by the touch panel 18, the operation position of the operation element is detected. Thereby, the current speed $V_{XN}$ (denoted as $V_N$, in FIG. 9) is calculated based on an operation position at detection time $T_{2+25msec}$, an operation position at detection time $T_2$, the detection time $T_{2+25msec}$ and the detection time $T_2$. Also, the operating speed $V_X$ calculated immediately before the current speed $V_{XN}$ becomes the previous speed $V_{XO}$ (denoted as $V_O$, in FIG. 9).

Then, after 25 msec elapses from the detection time $T_{2+25msec}$, i.e., at detection time $T_{2+50msec}$ (i.e., detection time $T_3$), when the detection is made by the touch panel 18, the operation position is not detected. For this reason, it is determined at detection time $T_3$ whether the current speed $V_{XN}$ is smaller than the previous speed $V_{XO}$. At this time, as can be seen from FIG. 9, it is determined that the current speed $V_{XN}$ is smaller than the previous speed $V_{XO}$ and the operation on the display 16 is the swipe operation. In this way, when the calculated operating speed $V_X$ is equal to or greater than the set speed B, the detection period by the touch panel 18 is made shorter than the period of the normal state, so that it is possible to appropriately determine the swipe operation in accordance with the user operation. Meanwhile, in the above, the operation that is performed when the operation element is moved in the left-right direction has been described. However, the operation that is performed when the operation element is moved in the upper-lower direction is also determined in the same manner. In this case, however, the current speed $V_{YN}$, the previous speed $V_{YO}$, the operating speed $V_Y$, and ΔY are used.

<Control Program>

The determination as to the operation on the display 16 and the display of the screen on the display 16 in accordance with the result of the determination are performed as the CPU 12 executes the control program 50. When the control program 50 is executed, flows depicted in FIGS. 10 to 13 and a flow depicted in FIG. 14 are repeatedly executed in parallel. Hereinafter, processing that is performed when the respective flows are executed is described.

Figure 10:
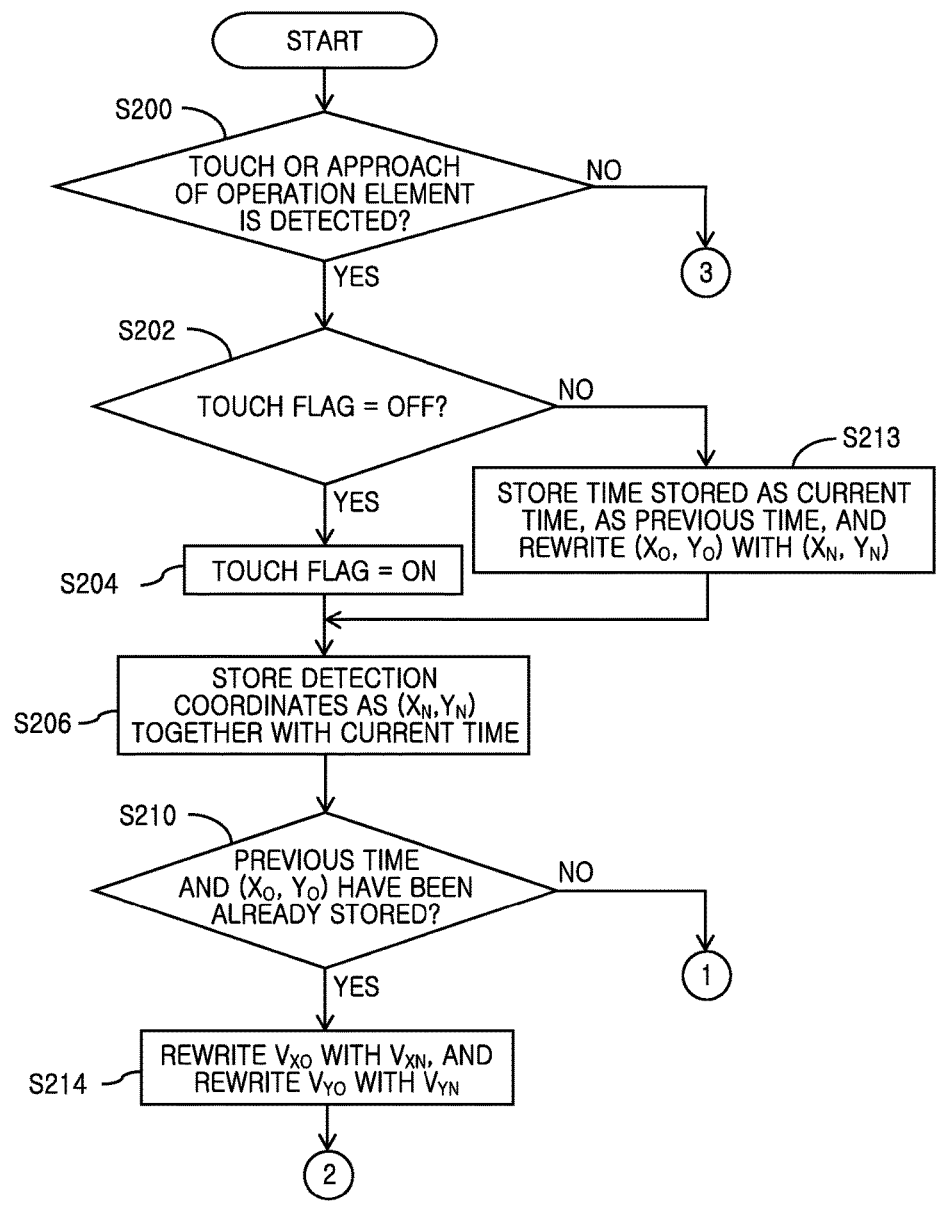
FIG. 10 is an operating flowchart of the MFP 10.

In the flows depicted in FIGS. 10 to 13, the detection is first made by the touch panel 18 and the CPU 12 determines whether the touch or approach of the operation element is detected by the touch panel 18 (S200), as shown in FIG. 10. When the touch or approach of the operation element is detected (S200: YES), the CPU 12 determines whether a touch flag is OFF (S202). The touch flag is a flag indicating whether the touch or approach of the operation element is detected by the touch panel 18. When the touch flag is ON, it indicates that the touch or approach of the operation element is detected by the touch panel 18, and when the touch flag is OFF, it indicates that the touch or approach of the operation element is not detected by the touch panel 18.

In the meantime, the touch flag is set to OFF, as an initial value. For this reason, when this flow is first executed, it is determined that the touch flag is OFF (S202: YES). By the touch or approach of the operation element determined in S200, the touch flag becomes ON (S204). Then, time at which the touch or approach of the operation element is detected in S200 is stored in the data storage area 52, as the current time, and the operation position detected at that time is stored in the data storage area 52, as the current coordinates ($X_N$, $Y_N$) (S206). Subsequently, the CPU 12 determines whether the previous time and the previous coordinates $(X_O, Y_O)$ have been stored in the data storage area 52 (S210). In the meantime, since the previous time and the previous coordinates $(X_O, Y_O)$ have not been stored in the data storage area 52, as the initial values, when this flow is first executed, it is determined that the previous time and the previous coordinates $(X_O, Y_O)$ have not been stored in the data storage area 52 (S210: NO). Then, as shown in FIG. 11, next detection timing is set to 50 msec (S212), and this flow is over.

Subsequently, after 50 msec elapses from the detection by the touch panel 18, the flows of FIGS. 10 to 13 are resumed. At this time, when the approach of touch of the operation element is continuously detected (S200: YES), it is determined in S202 whether the touch flag is OFF. However, since the touch flag has been ON in S204 upon the execution of the previous flow, it is determined that the touch flag is ON upon execution of this time flow (S202: NO). Then, the current time stored in the data storage area 52 is stored in the data storage area 52, as the previous time, and the current coordinates $(X_N, Y_N)$ stored in the data storage area 52 is stored in the data storage area 52, as the previous coordinates $(X_O, Y_O)$ (S213). Then, the time at which the touch or approach of the operation element is detected in S200 upon execution of this time flow is stored in the data storage area 52, as the current time, and the operation position detected at that time is stored in the data storage area 52, as the current coordinates $(X_N, Y_N)$ (S206).

Subsequently, it is determined whether the previous time and the previous coordinates $(X_O, Y_O)$ have been stored in the data storage area 52 (S210). However, since the previous time and the previous coordinates $(X_O, Y_O)$ have been stored in the data storage area 52 in S213 upon execution of this time flow, it is determined that the previous time and the previous coordinates $(X_O, Y_O)$ have been stored in the data storage area 52 (S210: YES). Subsequently, the current speed $V_{XN}$ is rewritten to the previous speed $V_{XO}$, and the current speed $V_{YN}$ is rewritten to the previous speed $V_{YO}$ (S214). In the meantime, since the current speeds $V_{XN}$, $V_{YN}$ have been stored in the data storage area 52, as the initial value 0, the current speeds $V_{XN}$, $V_{YN}=0$ are rewritten to the previous speeds $V_{XO}$, $V_{YO}$ upon execution of this time flow.

Figure 11:
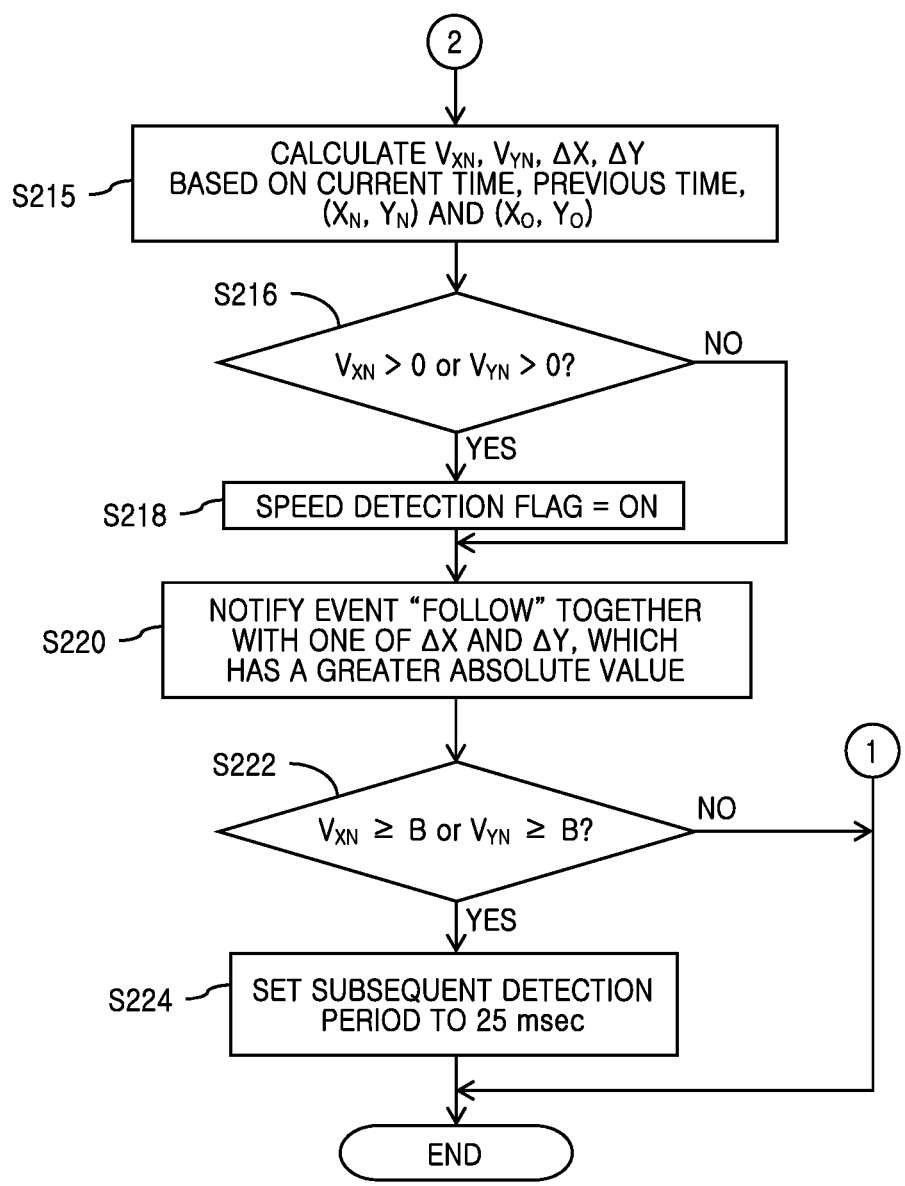
FIG. 11 is an operating flowchart of the MFP 10.

Then, as shown in FIG. 11, based on the current time, the previous time, the current coordinates $(X_N, Y_N)$ and the previous coordinates $(X_O, Y_O)$ stored in the data storage area 52, the current speeds $V_{XN}$, $V_{YN}$ and $\Delta X$ and $\Delta Y$ are calculated and stored in the data storage area 52 (S215). Subsequently, the CPU 12 determines whether the current speeds $V_{XN}$, $V_{YN}$ are greater than zero (0) (S216). At this time, when the current speeds $V_{XN}$, $V_{YN}$ are greater than zero (0) (S216: YES), i.e., when it is determined that the current operating speed of the operation element is greater than zero (0) and the operation element is moving, a speed detection flag becomes ON. The speed detection flag is a flag indicating whether the operation element has been moved before. When the speed detection flag is ON, it indicates that the operation element has been moved before, and when the speed detection flag is OFF, it indicates that the operation element has not been moved before.

Then, "follow" as the event information is notified together with one of $\Delta X$ and $\Delta Y$ stored in the data storage area 52, which has a greater absolute value (S220). On the other hand, when the current speeds $V_{XN}$, $V_{YN}$ are equal to or smaller than zero (0) (S216: NO), i.e., when the operation element is not moving, the processing of S218 is skipped over and the processing of S220 is executed. Subsequently, when the processing of S220 is executed, the CPU 12 determines whether the current speeds $V_{XN}$, $V_{YN}$ are equal to or greater than the set speed B (S222). When the current speeds $V_{XN}$, $V_{YN}$ are equal to or greater than the set speed B (S222: YES), a subsequent detection period is set to 25 msec (S224), and this flow is over. On the other hand, when the current speeds $V_{XN}$, $V_{YN}$ are not equal to or greater than the set speed B (S222: NO), the processing of S224 is skipped over and this flow is over.

Figure 12:
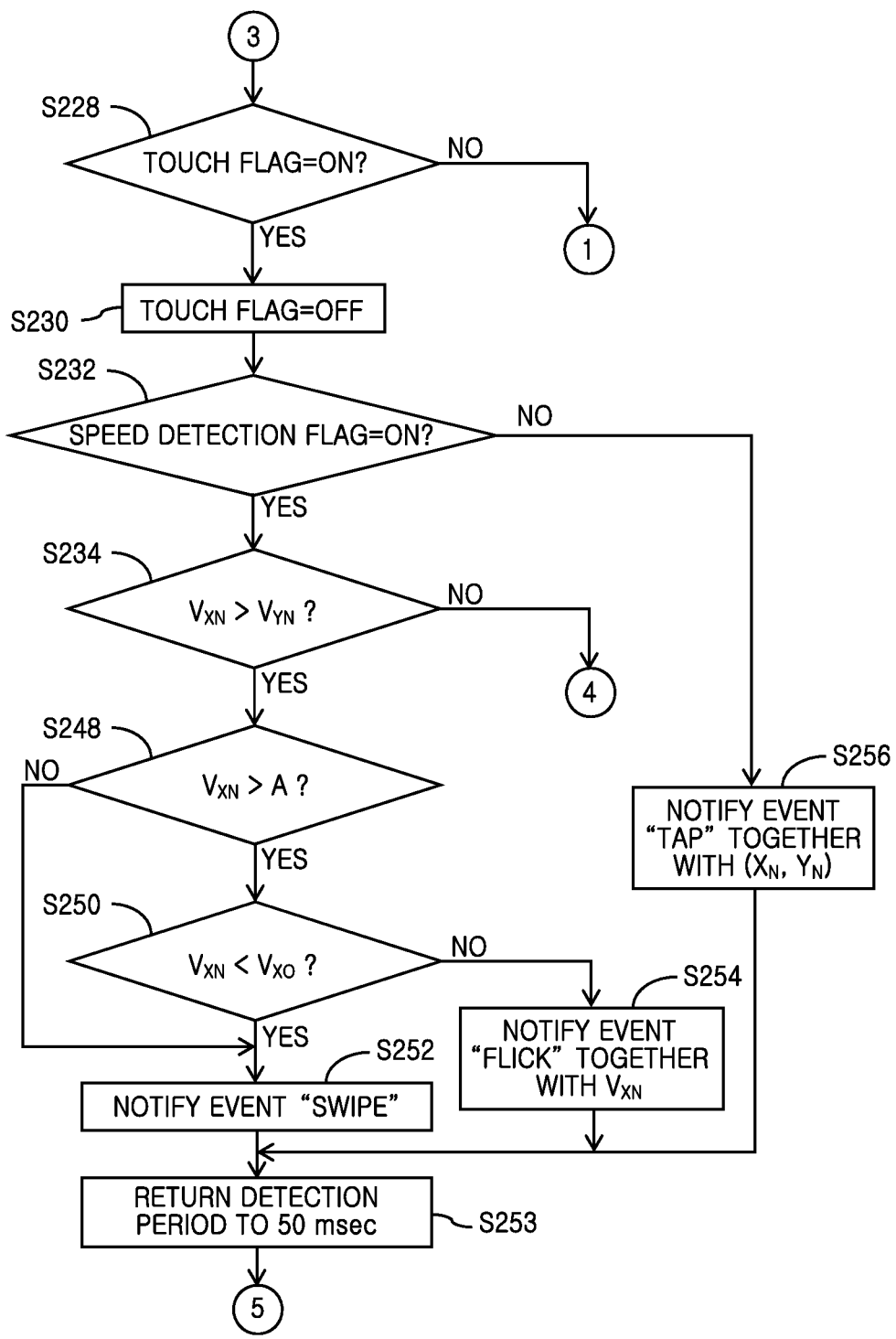
FIG. 12 is an operating flowchart of the MFP 10.
Figure 13:
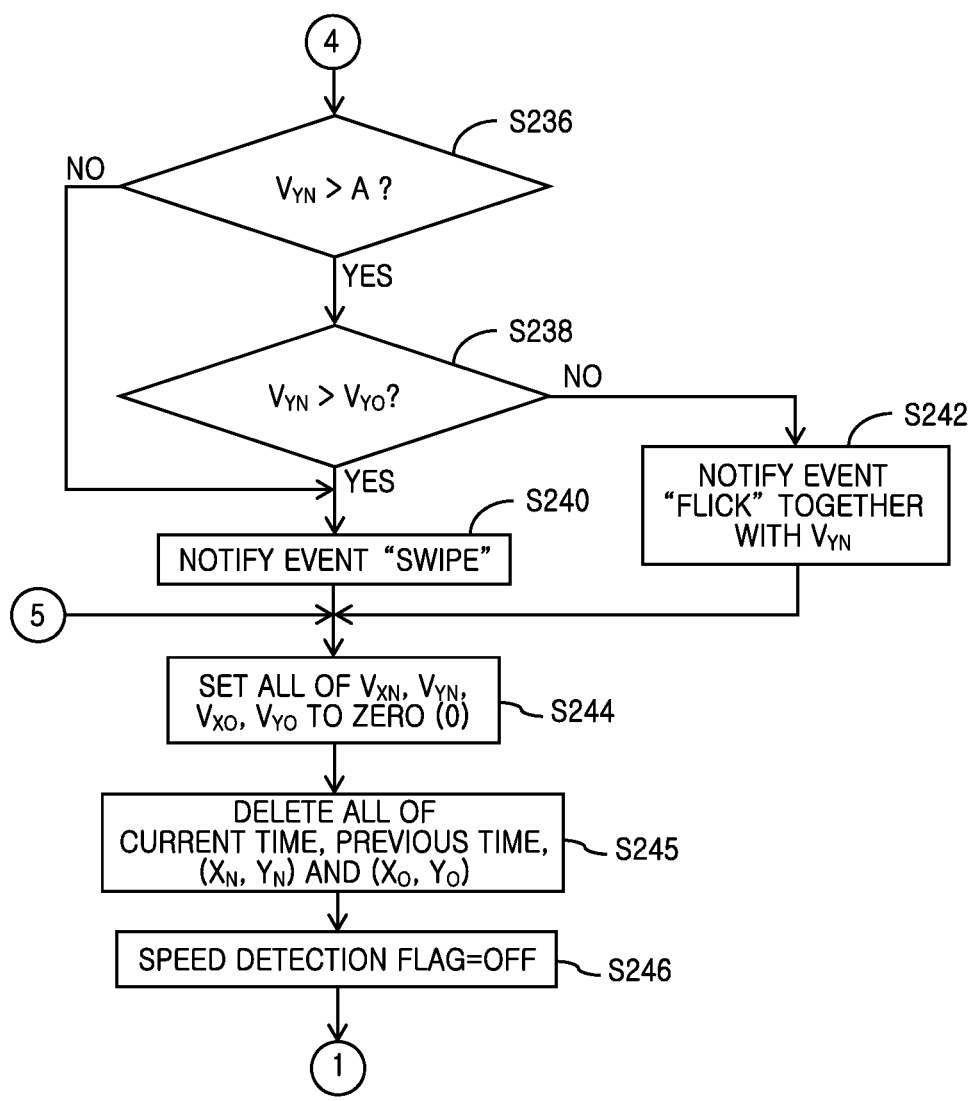
FIG. 13 is an operating flowchart of the MFP 10.
Figure 14:
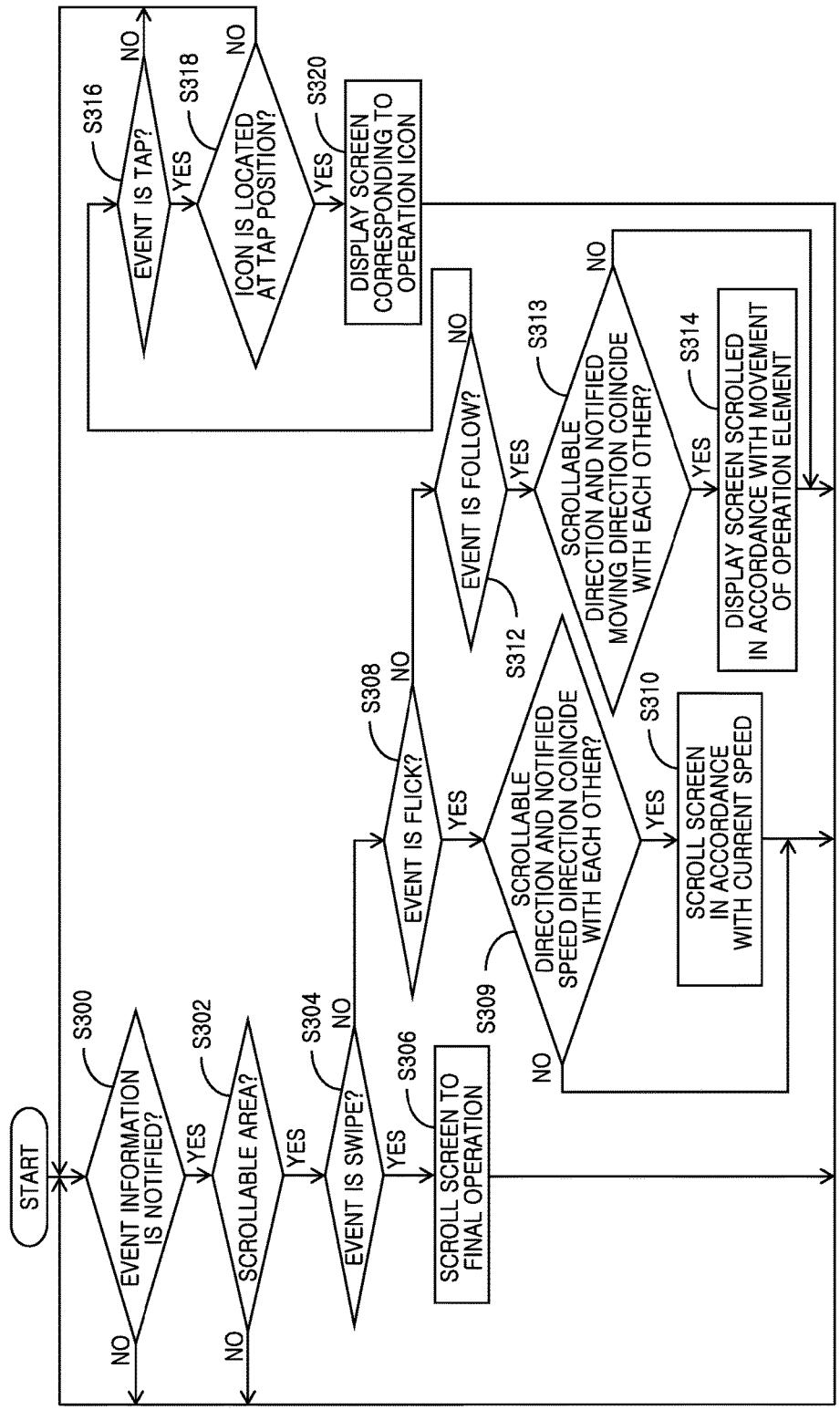
FIG. 14 is an operating flowchart of the MFP 10.

Subsequently, after the predetermined period has elapsed from the detection by the touch panel 18, i.e., after 25 msec has elapsed when the detection period is set in S224 or 50 msec has elapsed when the processing of S224 is skipped over, the flows of FIGS. 10 to 13 are resumed. At this time, when the approach or touch of the operation element is continuously detected (S200: YES), the processing of S202 and thereafter is executed. On the other hand, when the approach or touch of the operation element is not detected (S200: NO), the CPU 12 determines whether the touch flag is ON (S228), as shown in FIG. 12. When the touch flag is OFF (S228: NO), it can be seen that that the touch or approach of the operation element has not been detected when this flow was executed earlier than the previous time. That is, it can be seen that a state where the operation element has not touched or approached to the display 16 continues. For this reason, this flow is over. After 50 msec elapses from the detection by the touch panel 18, the flows of FIGS. 10 to 13 are resumed. That is, the processing S200 and thereafter is resumed.

Also, when it is determined in S228 that the touch flag is ON (S228: YES), it can be seen that that the touch or approach of the operation element has been detected when this flow was executed earlier than the previous time. That is, it can be seen that the operation element has been separated from the display 16 after the operation element was touched or approached to the display 16. Then, the touch flag becomes OFF (S230). Subsequently, the CPU 12 determines whether the speed detection flag is ON (S232). At this time, when the speed detection flag is ON (S232: YES), it can be seen that after the operation element has been moved, it has been separated from the display 16. For this reason, the CPU 12 determines whether the operating direction of the operation element is the left-right direction, i.e., whether the current speed $V_{XN}$ is greater than the current speed $V_{YN}$ (S234).

When the current speed $V_{XN}$ is equal to or smaller than the current speed $V_{YN}$ (S234: NO), the CPU 12 determines whether the current speed $V_{YN}$ is greater than the set speed A (S236), as shown in FIG. 13. When the current speed $V_{YN}$ is greater than the set speed A (S236: YES), the CPU 12 determines whether the current speed $V_{YN}$ is smaller than the previous speed $V_{YO}$ (S238). At this time, when the current speed $V_{YN}$ is not smaller than the previous speed $V_{YO}$ (S238: NO), it is determined that the operation on the display 16 is the flick operation, and "flick" as the event information is notified together with the current speed $V_{YN}$ stored in the data storage area 52 (S242). Then, the processing proceeds to S244.

When it is determined in S208 that the current speed $V_{YN}$ is smaller than the previous speed $V_{YO}$ (S238: YES), it is determined that the operation on the display 16 is the swipe operation, and "swipe" as the event information is notified (S240). Then, the processing proceeds to S244. Also, when it is determined in S236 that the current speed $V_{YN}$ is not greater than the set speed A (S236: NO), it is determined that the operation on the display 16 is the swipe operation, the processing of S238 is skipped over, and "swipe" as the event information is notified (S240). Then, the processing proceeds to S244.

Subsequently, in S244, the current speeds $V_{XN}$, $V_{YN}$ and the previous speeds $V_{XO}$, $V_{YO}$ are all set to zero (0) (S244). Subsequently, the current time, the previous time, the current coordinates $(X_N, Y_N)$ and the previous coordinates $(X_O, Y_O)$ are all deleted (S245). Also, the speed detection flag becomes OFF (S246). Then, this flow is over. When this flow is over, the flows of FIGS. 10 to 13 are resumed after 50 msec elapses from the detection by the touch panel 18. That is, the processing of S200 and thereafter is resumed.

When it is determined in S234 that the current speed $V_{XN}$ is greater than the current speed $V_{YN}$ (S234: YES), the CPU 12 determines whether the current speed $V_{XN}$ is greater than the set speed A (S248). When it is determined that the current speed $V_{XN}$ is greater than the set speed A (S248: YES), the CPU 12 determines whether the current speed $V_{XN}$ is smaller than the previous speed $V_{XO}$ (S250). At this time, when it is determined that the current speed $V_{XN}$ is not smaller than the previous speed $V_{XO}$ (S250: NO), it is determined that the operation on the display 16 is the flick operation, and "flick" as the event information is notified together with the current speed $V_{XN}$ stored in the data storage area 52 (S254). Then, the processing proceeds to S253.

When it is determined in S250 that the current speed $V_{XN}$ is smaller than the previous speed $V_{XO}$ (S250: YES), it is determined that the operation on the display 16 is the swipe operation, and "swipe" as the event information is notified (S252). Then, the processing proceeds to S253. In S253, the subsequent detection period is returned to 50 msec (S253). Then, the processing of S244 and thereafter is executed. Also, when it is determined in S248 that the current speed $V_{XN}$ is not greater than the set speed A (S248: NO), it is determined that the operation on the display 16 is the swipe operation, the processing of S250 is skipped over, and "swipe" as the event information is notified (S252). Then, the processing of S253 and thereafter is executed.

When it is determined in S232 that the speed detection flag is OFF (S232: NO), it can be seen that the operation element has been separated from the display 16 without being moved. For this reason, it is determined that the operation on the display 16 is a tap operation, and "tap" as the event information is notified together with the current coordinates $(X_N, Y_N)$ stored in the data storage area 52 (S256). Then, the processing of S253 and thereafter is executed.

In the flow of FIG. 14, the CPU 12 first determines whether the event information has been notified in the flows of FIGS. 10 to 13 (S300). When it is determined that the event information has not been notified (S300: NO), the processing of S300 is repeated. On the other hand, when it is determined that the event information has been notified (S300: YES), the CPU 12 determines whether the operation position of the operation element is positioned within the scrollable area of the display image, i.e., the current coordinates $(X_N, Y_N)$ are positioned in the scrollable area of the display image (S302).

When it is determined that the operation position of the operation element is not positioned within the scrollable area of the display image (S302: NO), the processing returns to S300. On the other hand, when it is determined that the operation position of the operation element is positioned within the scrollable area of the display image (S300: YES), the CPU 12 determines whether the notified event information is "swipe" (S304). When it is determined that the event information is "swipe" (S304: YES), the screen is scrolled to the final operation position of the operation element, i.e., the current coordinates $(X_N, Y_N)$ and is then displayed on the display 16 at a stopped state (S306). Then, the processing returns to S300.

When it is determined that the event information is not "swipe" (S304: NO), the CPU 12 determines whether the notified event information is "flick" (S308). When it is determined that the event information is "flick" (S308: YES), the CPU 12 determines whether a scroll direction of the image within the scrollable area (referred to as 'scrollable direction') coincides with the notified speed direction (S309). At this time, when it is determined that the scrollable direction and the notified speed direction coincide with each other (S309: YES), the screen is displayed on the display 16 with being scrolled in accordance with the current speeds $V_{XN}$, $V_{YN}$ (S310). Specifically, the scroll amount is calculated based on the current speeds $V_{XN}$, $V_{YN}$. Then, the screen is scrolled by a distance equivalent to the calculated scroll amount from timing at which the operation element is separated from the display 16, and then the scroll is stopped. Then, the processing returns to S300. On the other hand, when it is determined that the scrollable direction and the notified speed direction do not coincide with each other (S309: NO), the processing of S310 is skipped over and the processing returns to S300.

Also, when it is determined that the event information is not "flick" (S308: NO), the CPU 12 determines whether the notified event information is "follow" (S312). When it is determined that the event information is "follow" (S312: YES), the CPU 12 determines whether the scrollable direction and the notified moving direction coincide with each other (S313). At this time, when it is determined that the scrollable direction and the notified moving direction coincide with each other (S313: YES), a screen scrolled in accordance with the movement of the operation element is displayed (S314). Then, the processing returns to S300. On the other hand, when it is determined that the scrollable direction and the notified moving direction do not coincide with each other (S313: NO), the processing of S314 is skipped over and the processing returns to S300.

Also, when it is determined that the event information is not "follow" (S312: NO), the CPU 12 determines whether the notified event information is "tap" (S316). When it is determined that the event information is "tap" (S316: YES), the CPU 12 determines whether an operable icon is located at the tap position, i.e., at the current coordinates $(X_N, Y_N)$ (S318). When it is determined that an operable icon is located at the tap position (S318: YES), a screen corresponding to the icon located at the tap position is displayed on the display 16 (S320). Then, the processing returns to S300. Also, when it is determined that the event information is not "tap" (S316: NO), and when it is determined that an operable icon is not located at the tap position (S318: NO), the processing returns to S300.

In the meantime, the processing of S200 is an example of the detection processing. The processing of S215 is an example of the calculation processing. The processing of S222 is an example of the determination processing. The processing of S240, S242, S252 and S254 is an example of the decision processing. The processing of S306, S310 and S314 is an example of the display control processing.

In the meantime, the disclosure is not limited to the illustrative embodiment, and can be implemented into a variety of aspects where the illustrative embodiment is diversely changed and improved based on the knowledge of one skilled in the art. Specifically, in the illustrative embodiment, the disclosure is applied to the display 16 of the MFP 10. However, the disclosure can be applied to displays of various apparatuses inasmuch as the display has a touch panel.

Also, in the illustrative embodiment, the operating speed of the operation element is calculated based on the two operation positions detected by the touch panel 18. However, the operating speed can be calculated based on three or more operation positions. Also, in the illustrative embodiment, the operating speed of the operation element is calculated based on the operation positions continuously detected by the touch panel 18. However, the operating speed can be calculated based on the operation positions detected fragmentally (not continuously).

Also, in the illustrative embodiment, the time at which the operation position of the operation element is detected is stored, and the operating speed is calculated using the stored time. However, the operating speed can be calculated using the detection period of the operation position. That is, since the detection period of the detection position is 25 msec or 50 msec, the operating speed can be calculated using the detection period. Thereby, the disclosure can be applied to an apparatus having no clock function, too.

Also, in the illustrative embodiment, the events such as "flick", "follow" and the like is notified with the operating direction of the operation element being specified. However, the event can be notified without specifying the operating direction of the operation element. That is, for example, when "follow" is notified as the event, one of ΔX and ΔY, which has the larger absolute value, is notified together with the event. However, both ΔX and ΔY may also be notified together with the event. In this case, when the notification of the event is received, one of ΔX and ΔY notified together with the event, which coincides with the scrollable direction, is preferably adopted.

Also, in the illustrative embodiment, the processing of FIGS. 10 to 14 is executed by the CPU 12. However, the processing may be executed by an ASIC or other logical integrated circuits without being limited to the CPU 12. Also, the processing may also be executed by cooperation of the CPU, the ASIC and the other logical integrated circuits.

What is claimed is:

1. An information processing apparatus comprising:
    a display;
    a touch panel having a detection surface arranged on a display surface of the display; and
    a controller configured to execute:
        detection processing of detecting, each time a first predetermined period has elapsed, an operation position of an operation element which is touched on or adjacent to the detection surface,
        calculation processing of calculating, each time the operation position has been detected in the detection processing, a moving speed of the operation element based on the detected operation position and at least one operation position detected before the detected operation position is detected,
        first determination processing of determining, in a case where the operation position becomes not detected in the detection processing, by comparing a first speed and a second speed to determine whether the first speed is smaller than the second speed, the first speed being a moving speed of the operation element calculated in the calculation processing based on a latest operation position detected in the detection processing and at least one operation position detected in the detection processing before the latest operation position is detected, and the second speed being a moving speed of the operation element calculated in the calculation processing before the first speed is calculated in the calculation processing, wherein the first speed and the second speed are calculated in the calculation processing based on the operation element detected in a period from a first time to a second time, the first time being a time at which the operation element is in a position of touching on or in a position of adjacent to the detection surface, and the second time being a time at which the operation element is in a position of not touching or in a position of not adjacent to the detection surface, and
        decision processing of deciding, in a case where the operation position becomes not detected in the detection processing, that the operation by the operation element is a swipe operation in a case where the controller determines in the first determination processing that the first speed is smaller than the second speed.

2. The information processing apparatus according to claim 1,
    wherein, in the decision processing, in a case where the operation position becomes not detected in the detection processing, the controller decides that the operation by the operation element is the swipe operation if the first speed is equal to or smaller than a first threshold speed, irrespective of whether the first speed is smaller than the second speed.

3. The information processing apparatus according to claim 1,
    wherein, in the decision processing, in a case where the operation position becomes not detected in the detection processing, the controller decides that the operation by the operation element is a flick operation in a case where the controller determines in the first determination processing that the first speed is equal to or greater than the second speed.

4. The information processing apparatus according to claim 1,
    wherein the controller is further configured to execute:
        display control processing of displaying a plurality of icons on the display surface of the display, and
    wherein, in the display control processing, the controller scrolls the plurality of icons in accordance with the operation by the operation element in response to the controller deciding in the decision processing that the operation by the operation element is the swipe operation at a state where the plurality of icons is displayed on the display surface of the display, and when the controller stops the scroll, in a case where two or more icons of the plurality of icons are located in a preset setting area within an area of the display in which the plurality of icons is displayed, the controller displays only one icon among the two or more icons, which is located in the setting area and has the largest area, in the setting area.

5. The information processing apparatus according to claim 1,
    wherein the controller is further configured to execute:
        second determination processing of determining whether the moving speed calculated in the calculation processing is equal to or greater than a second threshold speed, and
    wherein, in the detection processing, in a case where the controller determines in the second determination processing that the moving speed is equal to or greater than the second threshold speed, the controller detects the operation position of the operation element each time a second predetermined period, which is shorter period than the first predetermined period, has elapsed.

6. The information processing apparatus according to claim 1,
wherein, in the decision processing, in a case where the operation position becomes not detected in the detection processing, the controller decides that the operation by the operation element is a flick operation in a case where the controller determines in the first determination processing that the first speed is equal to or greater than the second speed,
wherein the controller is further configured to execute:
  display control processing of displaying an image on the display surface of the display,
wherein, in the display control processing,
  while the operation position is continuously detected after the controller has started to detect the operation position of the operation element in the detection processing, the controller displays the image so that at least a part of the image follows movement of the detection position detected in the detection processing,
  in a case where the controller decides in the decision processing that the operation by the operation element is the flick operation, the controller displays the image so that at least a part of the image is moved in a direction of the first speed even after the operation position becomes not detected in the detection processing, and
  in a case where the controller decides in the decision processing that the operation by the operation element is the swipe operation, the controller displays the image so that at least a part of the image is stopped at a timing at which the operation position becomes not detected in the detection processing.

7. An information processing apparatus comprising:
a display;
a touch panel having a detection surface arranged on a display surface of the display, and
a controller configured to execute:
  detection processing of detecting, each time a predetermined period has elapsed, an operation position of an operation element which is touched on or adjacent to the detection surface,
  calculation processing of calculating, each time the operation position has been detected in the detection processing, a moving speed of the operation element based on the detected operation position and at least one operation position detected before the detected operation position is detected,
  determination processing of determining, in a case where the operation position becomes not detected in the detection processing, by comparing a first speed and a second speed to determine whether the first speed is smaller than the second speed, the first speed being a moving speed of the operation element calculated in the calculation processing based on a latest operation position detected in the detection processing and at least one operation position detected in the detection processing before the latest operation position is detected, and the second speed being a moving speed of the operation element calculated in the calculation processing before the first speed is calculated in the calculation processing,
wherein the first speed and the second speed are calculated in the calculation processing based on the operation element detected in a period from a first time to a second time, the first time being a time at which the operation element is in a position of touching on or in a position of adjacent to the detection surface, and the second time being a time at which the operation element is in a position of not touching or in a position of not adjacent to the detection surface, and
display control processing of displaying an image on the display surface of the display, wherein, in the display control processing,
while the operation position is continuously detected after the controller has started to detect the operation position of the operation element in the detection processing, the controller displays the image so that at least a part of the image follows movement of the detection position detected in the detection processing,
in a case where the operation position becomes not detected in the detection processing, in a case where the controller determines in the determination processing that the first speed is not smaller than the second speed, the controller displays the image so that at least a part of the image is moved in a direction of the first speed even after the operation position becomes not detected in the detection processing, and
in a case where the operation position becomes not detected in the detection processing, in a case where the controller determines in the determination processing that the first speed is not smaller than the second speed, the controller displays the image so that at least a part of the image is stopped at a timing at which the operation position becomes not detected in the detection processing.

8. A non-transitory computer-readable storage medium storing computer-readable instructions, the instructions, when executed by a computer of an information processing apparatus including a display and a touch panel having a detection surface arranged on a display surface of the display, causing the computer to execute:
  detection processing of detecting, each time a first predetermined period has elapsed, an operation position of an operation element which is touched on or adjacent to the detection surface,
  calculation processing of calculating, each time the operation position has been detected in the detection processing, a moving speed of the operation element based on the detected operation position and at least one operation position detected before the detected operation position is detected,
  first determination processing of determining, in a case where the operation position becomes not detected in the detection processing, by comparing a first speed and a second speed to determine whether the first speed is smaller than the second speed, the first speed being a moving speed of the operation element calculated in the calculation processing based on a latest operation position detected in the detection processing and at least one operation position detected in the detection processing before the latest operation position is detected, and the second speed being a moving speed of the operation element calculated in the calculation processing before the first speed is calculated in the calculation processing, wherein the first speed and the second speed are calculated in the calculation processing based on the operation element detected in a period from a first time to a second time, the first time being a time at which the operation element is in a position of touching on or in a position of adjacent to the detection surface, and the second time being a time at which the operation element is in a position of not touching or in a position of not adjacent to the detection surface, and decision processing of deciding, in a case where the operation position becomes not detected in the detection processing, that the operation by the operation element is a swipe operation in a case where the controller determines in the first determination processing that the first speed is smaller than the second speed.

9. The storage medium according to claim 8, wherein, in the decision processing, in a case where the operation position becomes not detected in the detection processing, the computer decides that the operation by the operation element is the swipe operation if the first speed is equal to or smaller than a first threshold speed, irrespective of whether the first speed is smaller than the second speed.

10. The storage medium according to claim 8, wherein, in the decision processing, in a case where the operation position becomes not detected in the detection processing, the computer decides that the operation by the operation element is a flick operation in a case where the controller determines in the first determination processing that the first speed is equal to or greater than the second speed.

11. The storage medium according to claim 8, wherein the instructions cause the computer to further execute:
display control processing of displaying a plurality of icons on the display surface of the display, and
wherein, in the display control processing, the computer scrolls the plurality of icons in accordance with the operation by the operation element in response to the computer deciding in the decision processing that the operation by the operation element is the swipe operation at a state where the plurality of icons is displayed on the display surface of the display, and when the computer stops the scroll, in a case where two or more icons of the plurality of icons are located in a preset setting area within an area of the display in which the plurality of icons is displayed, the computer displays only one icon among the two or more icons, which is located in the setting area and has the largest area, in the setting area.

12. The storage medium according to claim 8, wherein the instructions cause the computer to further execute:
second determination processing of determining whether the moving speed calculated in the calculation processing is equal to or greater than a second threshold speed, and
wherein, in the detection processing, in a case where the computer determines in the second determination processing that the moving speed is equal to or greater than the second threshold speed, the computer detects the operation position of the operation element each time a second predetermined period, which is shorter period than the first predetermined period, has elapsed.

13. The storage medium according to claim 8, wherein, in the decision processing, in a case where the operation position becomes not detected in the detection processing, the computer decides that the operation by the operation element is a flick operation in a case where the controller determines in the first determination processing that the first speed is equal to or greater than the second speed, wherein the instructions cause the computer to further execute:
display control processing of displaying an image on the display surface of the display,
wherein, in the display control processing,
while the operation position is continuously detected after the computer has started to detect the operation position of the operation element in the detection processing, the computer displays the image so that at least a part of the image follows movement of the detection position detected in the detection processing,
in a case where the computer decides in the decision processing that the operation by the operation element is the flick operation, the computer displays the image so that at least a part of the image is moved in a direction of the first speed even after the operation position becomes not detected in the detection processing, and
in a case where the computer decides in the decision processing that the operation by the operation element is the swipe operation, the computer displays the image so that at least a part of the image is stopped at a timing at which the operation position becomes not detected in the detection processing.

14. The information processing apparatus according to claim 1,
wherein the first speed is the moving speed of the operation element, at a latest operation position detected in the detection processing, that is calculated in the calculation processing based on the latest operation position and the at least one operation position detected in the detection processing before the latest operation position is detected, and
wherein the second speed is the moving speed of the operation element, at a previous operation position detected one before the latest operation position, that is calculated in the calculation processing based on the previous operation position and at least one operation position in the detection processing before the previous operation position is detected.

15. The information processing apparatus according to claim 7,
wherein the first speed is the moving speed of the operation element, at a latest operation position detected in the detection processing, that is calculated in the calculation processing based on the latest operation position and the at least one operation position detected in the detection processing before the latest operation position is detected, and
wherein the second speed is the moving speed of the operation element, at a previous operation position detected one before the latest operation position, that is calculated in the calculation processing based on the previous operation position and at least one operation position in the detection processing before the previous operation position is detected.

16. The storage medium according to claim 8,
wherein the first speed is the moving speed of the operation element, at a latest operation position detected in the detection processing, that is calculated in the calculation processing based on the latest operation position and the at least one operation position detected in the detection processing before the latest operation position is detected, and wherein the second speed is the moving speed of the operation element, at a previous operation position detected one before the latest operation position, that is calculated in the calculation processing based on the previous operation position and at least one operation position in the detection processing before the previous operation position is detected.

* * * * *

UNITED STATES PATENT AND TRADEMARK OFFICE
CERTIFICATE OF CORRECTION

PATENT NO.        : 10,338,808 B2
APPLICATION NO.   : 15/276126
DATED             : July 2, 2019
INVENTOR(S)       : Yutaka Urakawa Page 1 of 1

It is certified that error appears in the above-identified patent and that said Letters Patent is hereby corrected as shown below:

In the Claims

Column 20, Claim 7, Line 33 should read:
cessing that the first speed is smaller than the Signed and Sealed this
Third Day of September, 2019

Andrei Iancu
*Director of the United States Patent and Trademark Office*